(12) United States Patent
Shilling et al.

(10) Patent No.: US 11,994,258 B2
(45) Date of Patent: May 28, 2024

(54) METHODS OF PREVENTING FAILURE OF CORRUGATED TUBE IN TYPE IV PRESSURE VESSELS

(71) Applicants: LINAMAR CORPORATION, Guelph (CA); Jamie Shilling, Redwood City, CA (US); Jason Wexler, San Francisco, CA (US); Jordan Sanches, San Francisco, CA (US); Vladimir Kovalevsky, Rantigny (FR); Rustie McCumber, Albany, CA (US); Brian Schlotterbeck, San Francisco, CA (US)

(72) Inventors: Jamie Shilling, Redwood City, CA (US); Jason Wexler, San Francisco, CA (US); Jordan Sanches, San Francisco, CA (US); Vladimir Kovalevsky, Rantigny (FR); Rustie McCumber, Albany, CA (US); Brian Schlotterbeck, San Francisco, CA (US)

(73) Assignee: Linamar Corporation, Guelph (CA)

( * ) Notice: Subject to any disclaimer, the term of this patent is extended or adjusted under 35 U.S.C. 154(b) by 331 days.

(21) Appl. No.: 17/436,826

(22) PCT Filed: Mar. 5, 2020

(86) PCT No.: PCT/US2020/021108
§ 371 (c)(1),
(2) Date: Sep. 7, 2021

(87) PCT Pub. No.: WO2020/181047
PCT Pub. Date: Sep. 10, 2020

(65) Prior Publication Data
US 2022/0136652 A1 May 5, 2022

Related U.S. Application Data

(60) Provisional application No. 62/814,007, filed on Mar. 5, 2019.

(51) Int. Cl.
*F17C 1/08* (2006.01)
*F17C 1/16* (2006.01)

(52) U.S. Cl.
CPC .............. *F17C 1/08* (2013.01); *F17C 1/16* (2013.01); *F17C 2201/0138* (2013.01);
(Continued)

(58) Field of Classification Search
CPC ...... F17C 1/08; F17C 1/16; F17C 2201/0138; F17C 2201/0195; F17C 2203/012; F17C 2203/0604
(Continued)

(56) References Cited

U.S. PATENT DOCUMENTS 5,615,702 A  4/1997  Dawans et al.
6,145,692 A  11/2000  Cherevatsky
(Continued)

FOREIGN PATENT DOCUMENTS

FR  2661477 A  * 10/1991  ............... F16J 12/00
JP  2020090034 A  * 6/2020  ............... F17C 1/02

*Primary Examiner* — J. Gregory Pickett
*Assistant Examiner* — Niki M Eloshway
(74) *Attorney, Agent, or Firm* — Miller Canfield (57) ABSTRACT

A pressure vessel and a method of manufacturing the pressure vessel is provided that reduces leaks in type IV pressure vessels having a liner with a corrugated section. The method includes providing a liner having a tubular portion having a corrugated section with circumferential corrugations providing alternating ridges and grooves arranged from one end to an opposing end of the corrugated section, applying a barrier to an outer surface of the corrugated section from one end to an opposing end of the corrugated section such that air voids are formed in annular cavities between the liner and the barrier; and applying resin
(Continued)

US 11,994,258 B2

Page 2 to an outer surface of the barrier. The barrier prevents intrusion of the resin between the barrier and the liner in the corrugated section.

23 Claims, 9 Drawing Sheets

(52) U.S. Cl.
CPC .................. *F17C 2201/0195* (2013.01); *F17C 2203/012* (2013.01); *F17C 2203/0604* (2013.01); *F17C 2203/0624* (2013.01); *F17C 2203/066* (2013.01); *F17C 2203/0663* (2013.01); *F17C 2203/0675* (2013.01); *F17C 2205/0305* (2013.01); *F17C 2209/2154* (2013.01); *F17C 2209/227* (2013.01); *F17C 2209/232* (2013.01); *F17C 2221/012* (2013.01); *F17C 2221/016* (2013.01); *F17C 2221/017* (2013.01); *F17C 2221/033* (2013.01); *F17C 2221/035* (2013.01); *F17C 2260/011* (2013.01)

(58) Field of Classification Search
USPC ........................................... 220/590
See application file for complete search history.

(56) References Cited

U.S. PATENT DOCUMENTS

| 6,527,075 | B1* | 3/2003 | Izuchukwu | A61G 3/001 |
| | | | | 180/69.5 |
| 10,167,130 | B2* | 1/2019 | Pruitt | B65D 81/3876 |
| 10,690,288 | B2* | 6/2020 | Griffith | F17C 1/16 |
| 2010/0237081 | A1 | 9/2010 | Markus | |
| 2012/0138616 | A1* | 6/2012 | Lindner | F17C 1/16 |
| | | | | 29/428 |
| 2015/0007813 | A1 | 1/2015 | Sanders | |
| 2015/0048095 | A1* | 2/2015 | Sanders | B65B 5/04 |
| | | | | 220/586 |
| 2018/0265659 | A1* | 9/2018 | Okamoto | C08G 59/68 |
| 2019/0077109 | A1* | 3/2019 | Takemoto | B29C 53/62 |
| 2020/0182404 | A1* | 6/2020 | Sawai | F17C 1/16 |

* cited by examiner

METHODS OF PREVENTING FAILURE OF CORRUGATED TUBE IN TYPE IV PRESSURE VESSELS

CROSS-REFERENCE TO RELATED APPLICATIONS

This application claims priority to U.S. Provisional Application No. 62/814,007, filed on Mar. 5, 2019.

BACKGROUND OF THE INVENTION

1. Field of the Invention

The present invention relates to a type IV pressure vessel for storage of compressed gas. More particularly, the invention relates to a type IV pressure vessel having a corrugated polymer liner with a barrier applied to the liner prior to covering the liner with fiber and resin.

2. Description of Related Art

Type IV pressure vessels for storage of compressed gas comprise a non-metallic liner that is fully wrapped with fibers and a resin matrix. The resin matrix typically comprises a polyester or epoxy resin. The type IV pressure vessel generally includes a metal pressure vessel closure that includes a valve.

Type IV pressure vessels are desirable for use in vehicles since the type IV pressure vessels have lower weight per unit volume of the pressure vessel in comparison to other types of pressure vessels. The type IV pressure vessels are formed from a non-metallic liner and covered with fiber and resin. Other types of pressure vessels generally have higher weight per volume of the pressure vessel than the type IV pressure vessels since other types of pressure vessels include more metal than in the type IV pressure vessel. For example, type I pressure vessels comprise a metal cylinder. Type II pressure vessels comprise a metal cylinder that is partially wrapped with fiber material. Type III pressure vessels comprise a metal liner that is fully wrapped with fiber. Thus, type IV pressure vessels are preferred for vehicle use due to the lower weight associated with using a polymer liner in place of a metal liner.

Vehicles are optionally equipped with type IV pressure vessels when the vehicle includes a hydrogen fuel cell and/or when the vehicle uses compressed natural gas as a fuel. While other types of pressure vessels, such as types I-III, can be used for vehicles, type IV is preferred due to the lower weight of the pressure vessel.

A known method of manufacturing pressure vessels having a polymer liner is disclosed in U.S. publication 2016/363265 wherein fiber is braided around a corrugated polymer liner and coated with resin. The polymer liner has a generally tubular shape having a corrugated portion. The corrugated portion includes a plurality of spaced apart ridges extending circumferentially around the liner with a groove between adjacent ridges. Air space between adjacent ridges defines an annular cavity. The polymer liner is covered with braided fiber and liquid resin prior to the resin being cured to form a hard outer surface. The cured coated polymer liner is assembled with a metal pressure valve to form the type IV pressure vessel.

However, sometimes the liquid resin does not completely fill the annular cavities of the corrugations and results in air pockets in the annular cavities. When the pressure vessel is pressurized, pressure is evenly applied along the internal surface of the liner. When air pockets are present in the annular cavities, in particular when air bubbles are trapped along one side wall of the groove, pressure applied to the liner is not evenly supported by the resin. The strain on the liner adjacent the air pockets can result in the liner blistering outward toward the resin. The distortion of the liner may result in leaks. In certain instances, the liner can rupture in the area of the air pocket, accelerating leakage of compressed gas through the liner.

It is desirable, therefore, to provide a type IV pressure vessel having a liner with corrugated sections that are resistant to leakage through the corrugated sections. It is also desirable to avoid rigid air pockets forming between the resin and the liner. Further, it is desirable to provide uniform support along annular cavities of the corrugations to reduce strain on the liner. Finally, it is desirable to include a barrier between the liner and resin covering the liner such that resin does not contact the corrugated sections of the liner.

SUMMARY OF THE INVENTION

A method is provided for reducing leaks in type IV pressure vessels having a liner with a corrugated section. The method includes providing a liner having a tubular portion with a corrugated section including circumferential corrugations providing alternating ridges and grooves arranged from one end to an opposing end of the corrugated section, applying a barrier to an outer surface of the corrugated section from one end to an opposing end of the corrugated section such that air voids are formed in annular cavities between the liner and the barrier; and applying resin to an outer surface of the barrier. The barrier prevents intrusion of the resin between the barrier and the liner in the corrugated section.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Referring to the Figures, like numerals indicate like or corresponding parts throughout the several views.

Figure 1:
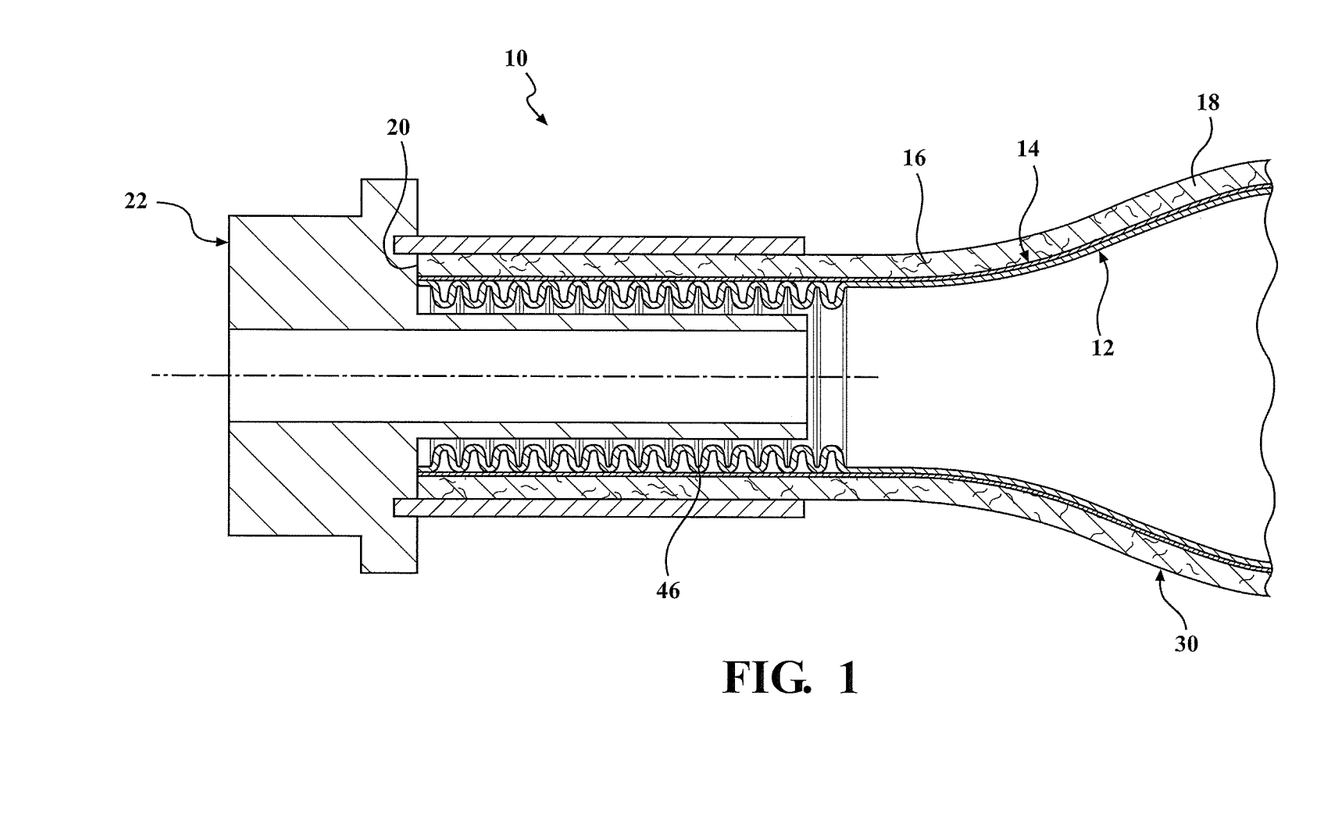
FIG. 1 is a cross-sectional view of a portion of a type IV pressure vessel, according to one embodiment of the present invention.

A type IV pressure vessel 10 is shown in FIG. 1, according to one embodiment of the present invention. The pressure vessel 10 is formed from a liner 12 covered with a barrier 14, fiber 16, and resin 18, as shown in FIG. 1. One or both ends 20 of the liner 12 generally are fluidically connected to a valve 22 to form a sealed pressure vessel 10. The opposing end 20 of the coated liner 12 can likewise be assembled with a valve 22 or can be enclosed by other commonly known methods.

Once fully assembled, the pressure vessel 10 is suitable for storage of liquids, compressed gases and/or compressed liquids, such as hydrogen, natural gas, helium, dimethyl ether, liquefied petroleum gas, xenon, and the like. A pressure vessel 10 for storage of hydrogen for automotive applications typically is designed for about 5,000 PSI to about 10,000 PSI of internal pressure during normal use. In comparison, pressure vessels 10 for storage of compressed natural gas are typically designed for about 3,000 PSI of internal pressure during normal use. Thus, the selection of materials and dimensions for the liner 12, as well as the type and amount of resin 18 and fiber 16, are selected based on the desired operating conditions of the pressure vessel 10.

Figure 2:
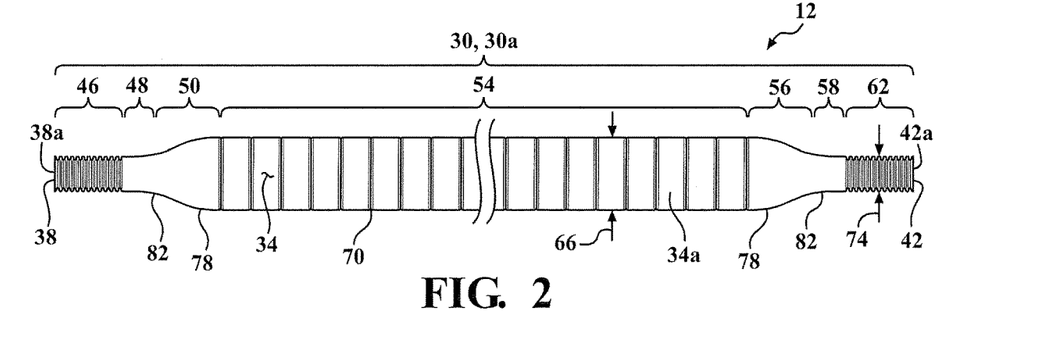
FIG. 2 is a fragmentary side view of a liner, according to one embodiment of the present invention.

Type IV pressure vessels 10 may include a liner 12 comprising a polymer material with the liner 12 having a tubular shaped section 30, 30a such as illustrated in FIG. 2.

Figure 3:
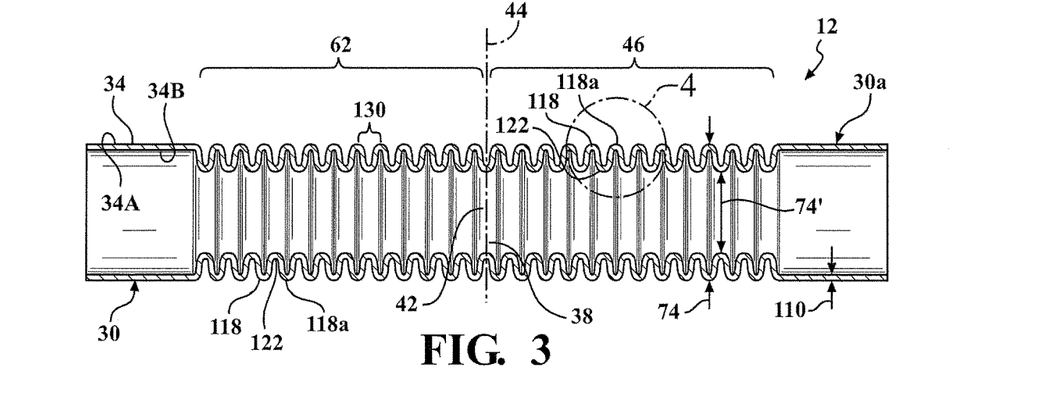
FIG. 3 is a cross-sectional view of a portion of the liner of FIG. 2

The liner 12 can include any size, shape, length, material, and contour as desired for a specific application without altering the scope of the invention. The liner 12 shown in FIGS. 2 through 4, according to one embodiment of the present invention, is a polymer tube 12 comprising a number of repeating liner sections 30, 30a. The liner 12 can include any number of liner sections 30, 30a as desired for an intended application, including a single liner section 30, 30a, two liner sections 30, 30a, four liner sections 30, 30a, and the like. The liner 12 includes a liner wall 34, a liner outer surface 34a, a liner inner surface 34b, a first end 38 having an inlet 38a, and a second end 42 having an outlet 42a. Optionally, the second end 42 may be enclosed, i.e., may lack an outlet 42a. In addition, the second end 42 may adjoin a first end 38 of a second liner section 30a, as shown in FIG. 3. Optionally, the liner 12 can include any number of repeating liner sections 30, 30a with the liner 12 being cut along line 44 to form separate liners 12 as desired. In the embodiment shown in FIG. 2, each repeating liner section 30, 30a comprises a first small diameter corrugated section 46 adjoining a first small diameter non-corrugated section 48, a first tapered section 50 adjoining the first small diameter non-corrugated section 48, a large diameter ribbed section 54 adjoining the first tapered section 50, a second tapered section 56 adjoining the large diameter ribbed section 54, a second small diameter non-corrugated section 58 adjoining the second tapered section 56, and a second small diameter corrugated section 62 adjoining the second small diameter non-corrugated section 58. However, it should be appreciated that each repeating liner section 30, 30a can include any combination, order, contour, length, diameter, wall thickness, and/or number of corrugated sections 46, 62, non-corrugated sections 48, 50, 56, 58, and ribbed sections 54, as well as omitting selected sections 46, 48, 50, 56, 58, 62, without altering the scope of the invention. For example, in one embodiment, a liner section 30, 30a can comprise non-corrugated sections 48, 58 adjacent each end 38, 42 of the liner section 30, 30a. In another embodiment, the liner sections 30, 30a can have a uniform outer diameter from one end 38 to the opposing end 42 of the liner sections 30, 30a.

In the exemplary embodiment shown in FIG. 2, the repeating liner section 30, 30a has an approximate overall length of about 1 meter. The large diameter tube section 54 has an outer diameter 66 of about 46 mm and extends longitudinally for about 650 mm. Circumferential ribs and/or grooves 70 are optionally positioned along the length of the large diameter tube section 54. The small diameter non-corrugated sections 48, 58 and the small diameter corrugated sections 46, 62 have an outer diameter 74 of about 21 mm. The approximate overall length of the small diameter non-corrugated sections 48, 58 and the small diameter corrugated sections 46, 62 are about 60 mm and 140 mm, respectively. Each tapered section 50, 56 has an outer diameter 66 of about 46 mm on a first end 78, an outer diameter 74 of about 21 mm on an opposing end 82, and an overall length of about 75 mm. The wall thickness 110 of the liner wall 34 is generally between about 0.3 mm and about 1.2 mm, with non-corrugated sections 48, 58, 54 having wall thickness 110 in the range of about 0.5 to about 1.2 mm and a minimum wall thickness 114 in the corrugated sections 46, 62 of about 0.3 mm. However, it will be appreciated that the wall thickness 110, 114, outer diameter 66, 74, inner diameter 74', length, and number of corrugated sections 46, 62 and non-corrugated sections 48, 58 of the liner 12 may be larger or smaller than this range as desired for an intended application without altering the scope of the invention.

The liner 12 can comprise one or more layers of materials as desired for an intended application. Exemplary liner 12 materials include Nylon, Nylon 6 (PA6), high density polyethylene (HDPE), polyethylene (DPE), ethylene-vinyl acetate (EVA), linear low-density polyethylene (LLDPE), low density polyethylene (LDPE), polypropylene (PP), ethylene vinyl alcohol (EVOH), polytetrafluoroethylene (PTFE), polyurethane (PU), polyvinyl chloride (PVC), or the like. Further, the liner 12 can comprise a multi-layer polymer and/or metal. For example, such a liner 12 can be generated via vapor deposition, multi-layer extrusion, and/or molding, or the like. Thus, the liner 12 can comprise a single material, such as Nylon as an example, or can comprise a multi-layer material. Exemplary embodiments of a multi-layer liner 12 include an EVOH layer between a first and second nylon layer, an EVOH layer between first and second polyethylene (DPE) layers, a EVAL™ ethylene vinyl alcohol copolymer (EVOH) LA170B layer between first and second Rilsan® TIEFLEX S442 NAT TL layers sandwiched between first and second Rilsan® polyamide 11 (PA11) BESN Black P126 TL layers, as non-limiting examples. In various embodiments a liner 12 can comprise or consist of any suitable number of layers of materials including one layer, two layers, three layers, four layers, five layers, six layers, or the like. The liner 12 is generally a polymer liner 12 that is non-metallic; however, the polymer liner 12 can include a metal layer within the liner 12, forming an inner surface 34b, and/or forming an outer surface 34a of the liner 12.

Figure 4:
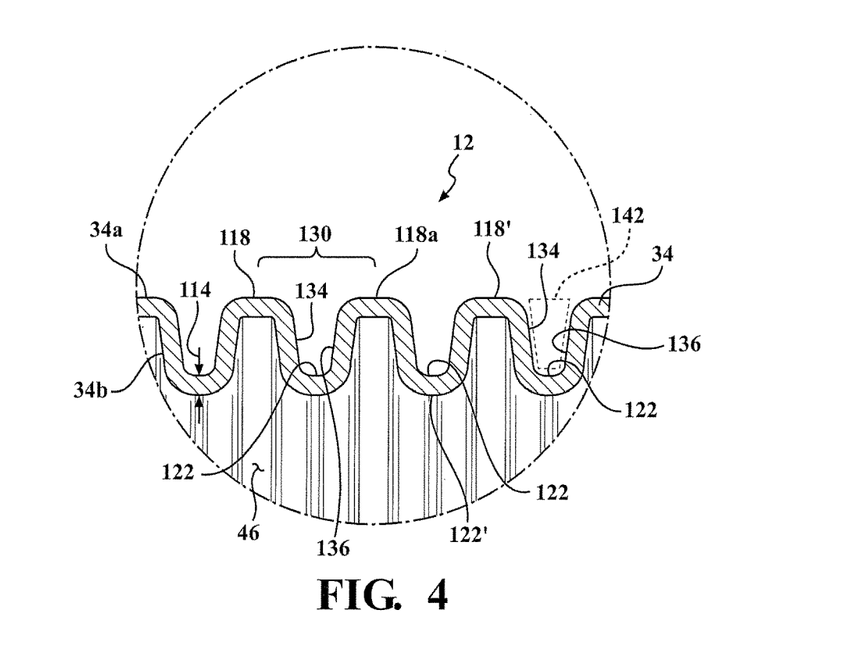
FIG. 4 is an enlarged view of the liner of FIG. 3.

As illustrated in FIGS. 3 and 4, corrugated sections 46, 62 include a plurality of spaced apart ridges 118, 118a extending circumferentially around the liner 12 with a groove 122 between adjacent ridges 118, 118a. In the corrugated sections 46, 62, the outer surface 118' of the ridges 118, 118a define an outer diameter 74 of the liner 12 with the inner surface 122' of the grooves 122 defining an inner diameter 74' of the tube. A single corrugated segment 130 includes a first ridge section 118, a first side wall 134 extending between the first ridge section 118 and a first groove section 122, and a second side wall 136 extending between the first groove section 122 towards a second ridge section 188a. Air volume 142 between the first side wall 134, the first groove section 122, and the second side wall 136 defines an annular cavity 142. The corrugated sections 46, 62 of the liner 12 include a plurality of spaced apart corrugated segments 130. The spacing between adjacent ribs 70, adjacent ridge sections 118, and/or adjacent groove sections 122 can vary without altering the scope of the invention. Further, the dimensions and/or contours of each of the ribs 70, ridges 118, 118a, grooves 122, and side walls 134, 136 may vary without altering the scope of the invention. In one embodiment, one or more of the spaced apart ridges 118, 118a, one or more of the ribs 70, and/or one or more of the grooves 122 optionally may extend partially around the circumference of the liner 12 without varying the scope of the invention.

Figure 5:
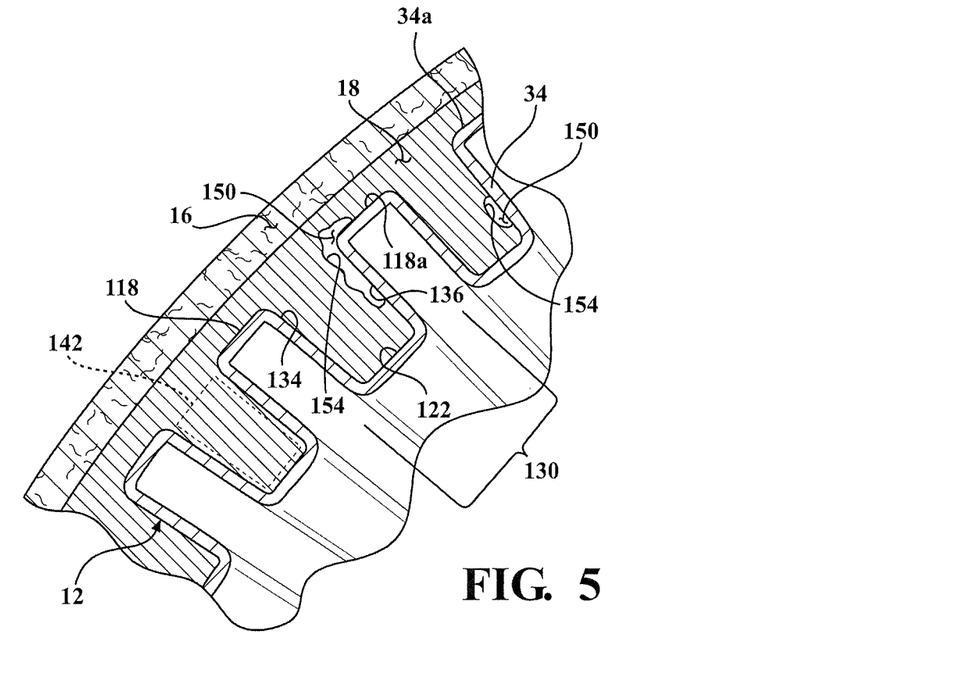
FIG. 5 is an enlarged cross-sectional view of a generally known corrugated liner coated with resin and fiber.

Referring to FIG. 5, when the polymer liner 12 includes corrugated segments 130, covering the corrugated liner 12 with liquid resin 18 and fiber 16 can trap air bubbles 150 in the annular cavities 142 of the corrugated segments 130. The liquid resin 18 can incompletely fill the annular cavities 142 during infusion steps of the manufacturing process. When the resin 18 cures, rigid air pockets 154 form in the annular cavities 142. The rigid air pockets 154 are caused by the incomplete fill of the annular cavities 142 by the resin 18. Air pockets 154 caused by trapped air bubbles 150 and/or incomplete resin 18 fill of the annular cavities 142, generally form along the groove 122 and/or along the side walls 134, 136 of the corrugated segments 130. In addition, sometimes the fiber 16 is laid down along the corrugated outer surface 118, 118a of the liner 12 such that the fibers 16 do not conform to the entirety of the liner's 12 corrugated surface 118, 118a. The gaps between the fiber 16 and the liner 12 can contribute to the formation of air pockets 154 along the outer surface 34a of the liner 12.

Upon pressurization, the liner 12 may strain to failure at the air pocket 154 locations, causing blisters 158 to form in the polymer liner 12. Blisters 158 are sections of the liner 12 that have been distorted and wherein the thickness of the liner wall 34 has been reduced. The blisters 158 in the liner 12 allow pressurized gas to leak out of the liner 12. In certain cases, the polymer liner 12 can rupture and/or form pin hole leaks 158a at the locations of the blisters 158.

Figure 6:
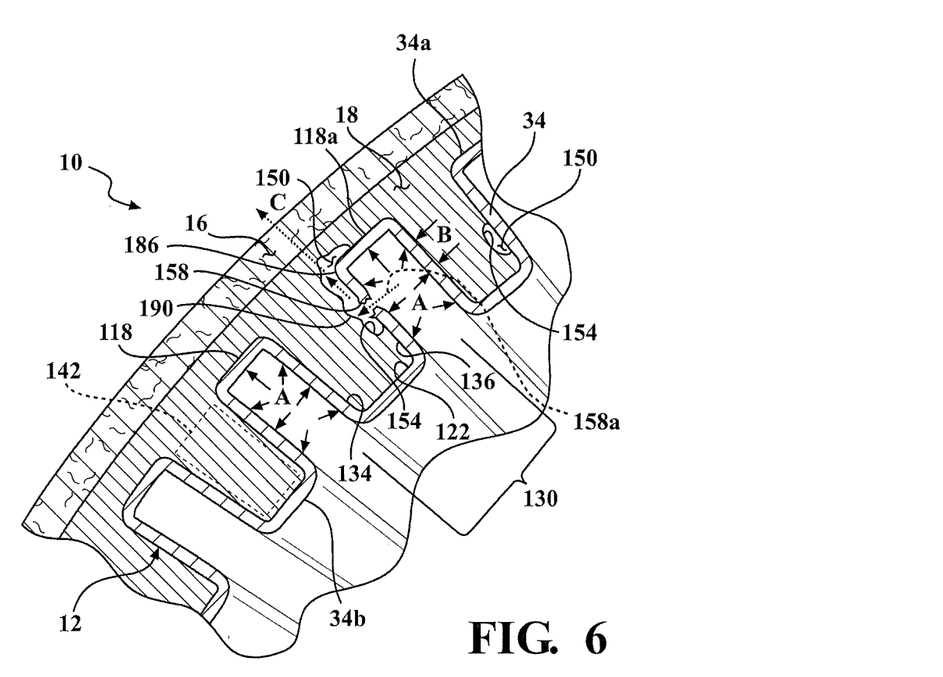
FIG. 6 is an enlarged cross-sectional view of the generally known corrugated liner coated with resin and fiber of FIG. 5, illustrating internal pressurization.

When the pressure vessel 10 is pressurized, pressure is uniformly distributed across the interior surface 34b of the liner 12, as represented by arrow A shown in FIG. 6. The fiber 16 and resin 18 apply resistive pressure, represented by arrow B, against the outer surface 34a of the liner 12. However, the fiber 16 and resin 18 provide insufficient resistive pressure against the outer surface 34a of the liner 12 where air pockets 154 have formed along the liner 12 outer surface 34a. As such, there will be an imbalance of forces applied to the liner 12 adjacent the air pockets 154. The imbalance of forces can allow the liner 12 to strain locally beyond its breaking point, causing leaks, as represented by arrow C shown in FIG. 6.

Figure 7:
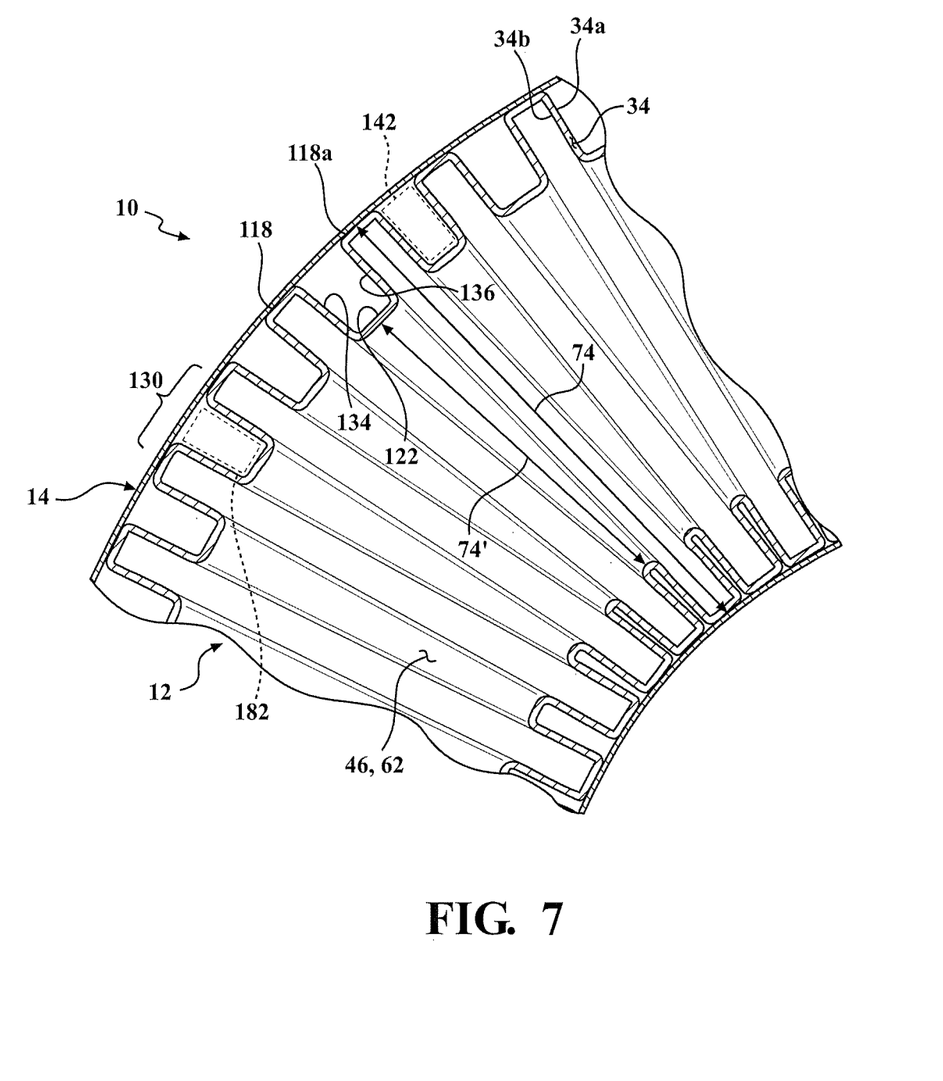
FIG. 7 is an enlarged cross-sectional view of the liner of FIG. 2 having a barrier applied to the liner, according to one embodiment of the present invention.

A method to prevent formation of rigid air pockets 154 within the annular cavities 142 of the corrugated segments 130 is illustrated in FIGS. 7-11, according to one embodiment of the present invention. A barrier 14 is applied to the corrugated segments 130 prior to application of resin 18 and fiber 16 as illustrated in FIG. 7. The barrier 14 blocks uncured resin 18 from entering the annular cavities 142 between the liner 12 and barrier 14.

The barrier 14 completely covers the corrugated segments 130 and surrounds the circumference of the corrugated segments 130. In addition, the barrier 14 can be applied to selected corrugated segments 130 of the liner 12 comprising the corrugated sections 46, 62. Preferably, the barrier 14 is applied to the entirety of the corrugated sections 46, 62 with the barrier 14 covering all the corrugated segments 130. In addition, the barrier 14 can cover selected non-corrugated sections 48, 50, 56, 58 of the liner 12 as well as covering ribbed sections 54 of the liner 12. Further, the barrier 14 may cover the entirety of the liner 12 if desired. In a preferred embodiment, the barrier 14 completely covers the entirety of the liner wall 34, fully covering corrugated and non-corrugated liner sections 48, 50, 54, 56, 58, 62, without obstructing openings 38a, 42a of the liner 12.

The barrier 14 may be applied as a tape, a film, a sheet, a wrap, and/or molded rubber, as non-limiting examples, to form a barrier layer. Exemplary suitable barrier materials include thermoplastic materials, elastomeric materials, and dry fiber 16, as non-limiting examples. Another suitable barrier material is polysiloxane rubber sheet with a thickness of about 0.5 mm and having an acrylic adhesive backing layer, such as McMaster-Carr® 86915K22. Polyurethane protective tape having a thickness of about 0.21 mm and having a pressure-sensitive acrylic adhesive-back, such as 3M™ 8672 tape is an example of a suitable thermoplastic elastomer tape for use as a barrier 14. Other suitable barrier materials include polyurethane (PU), polytetrafluoroethylene (PTFE), Nylon, synthetic rubber such as silicone, ethylene propylene diene terpolymer (EPDM), and acrylonitrile butadiene rubber (Nitrile), and the like. Exemplary suitable barrier films include polyethylene, polypropylene and polyvinyl chloride, and the like. Further, the barrier 14 can be formed by overmolding the barrier 14 onto the liner 12. Suitable exemplary overmolded barrier materials include synthetic rubber and plastics including nylon and silicone, and the like. The barrier 14 can include adhesive backing that is self-fusing, not self-fusing, and/or the barrier 14 can omit an adhesive backing as desired for an intended application. A preferred embodiment includes a low-density polyethylene stretch film barrier layer 14 wrapped tightly over the liner 12 to form a water-tight seal.

Preferably, the barrier 14 comprises a relatively thin sheet, film, and/or tape with thickness approximately 0.5 mm or less, and more preferably about 0.25 mm or less. Further, preferred barrier 1 materials have a high strain to break ratio, such as at least about 150% strain to break ratio or larger. However, certain barrier materials having a strain to break ratio of less than 150% may be suitable for certain applications.

Further, it is desirable to select a barrier material that adheres to the underlying liner 12 and is resistant to cure temperatures of the resin 18. For example, for resin tanks heated to about 250° F., self-fusing barrier materials are suitable, as well as barrier materials which soften or melt together but do not flow, at temperatures reached during the resin curing process. For example, low-density polyethylene film does not melt entirely at 250° F. but adjacent layers of the polyethylene film will fuse together.

In addition, it is desirable to select a barrier material that has chemical compatibility with selected resin 18, i.e., the resin 18 preferably should not degrade the barrier material. In addition to avoiding chemical incompatibility, barrier materials that cannot be adhered to the liner 12 material are less desirable. For example, certain barrier materials and/or adhesive backing materials are less desirable when the liner 12 includes an outer surface 34a of Nylon or polyethylene. Preferably, the barrier 14 forms a water-tight seal with the liner 12 to prevent intrusion of the liquid resin 18 into the annular cavities 142.

Figure 8:
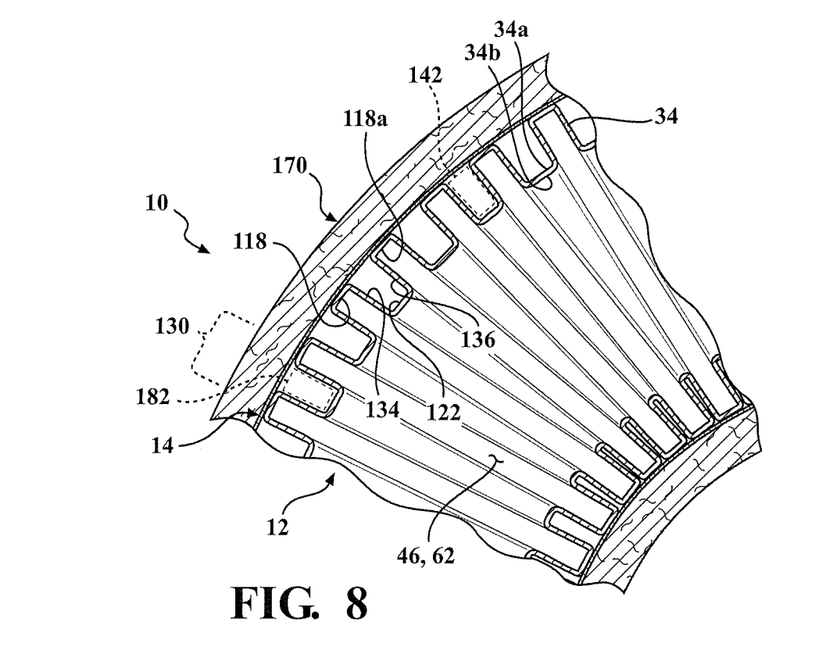
FIG. 8 is an enlarged cross-sectional view of the liner of FIG. 7 having a resin fiber composite applied to the barrier.
Figure 9:
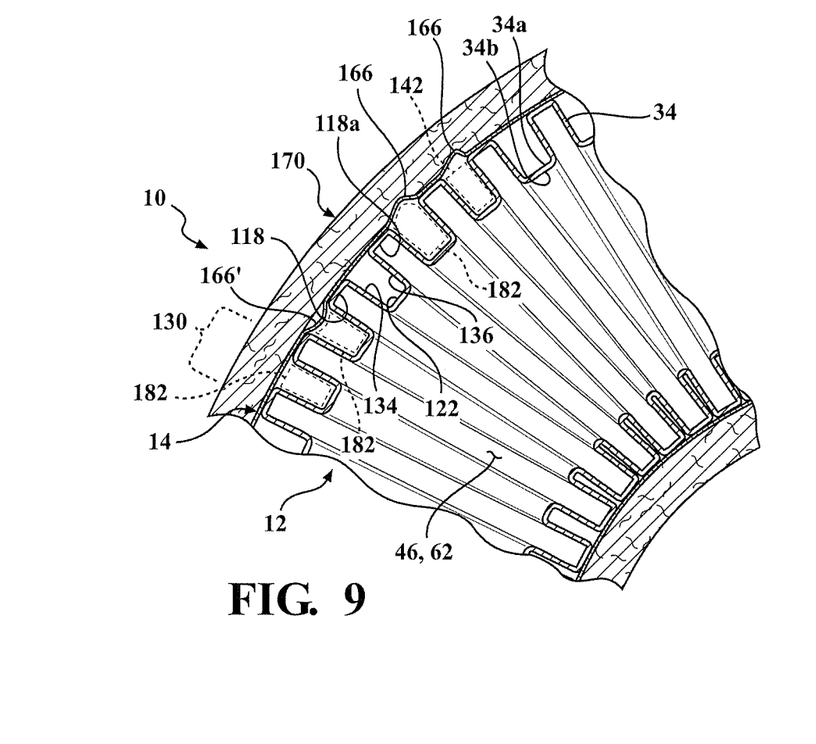
FIG. 9 is an enlarged cross-sectional view of the liner of FIG. 2 having a barrier applied to the liner and a resin fiber composite applied to the barrier.

The barrier 14 can be assembled and/or adhered with the liner 12 with the barrier 14 smoothly extending along the ridges 118, 118a of the corrugated segments 130 as shown in FIG. 8. However, the barrier 14 can include outward irregularities 166 such as bumps, bubbles, creases, and/or folds and the like, as well as inward dips 166' into the annular cavities 142, as illustrated in FIG. 9, without affecting the function of the barrier 14. An air void 182 is formed under the barrier 14 in each of the annular cavities 142 of the corrugated segments 130, as shown in FIG. 8. The space between adjacent lower side wall portions 134, 136, the barrier 14, and the groove 122 define an air void 182 in the annular cavity 142. The volume of the air void 182 may be more or less than the volume of the annular cavity 142 in each corrugated segment 130 depending on the local contour of the barrier 14. Outward irregularities 166 and dips 166' in the barrier 14 affect the volume of the air voids 182. Even if the barrier 14 intrudes into the annular cavity 142, an air void 182 will still form between the barrier 14 and the liner 12 in the corrugated segment 130.

While both air pockets 154 and air voids 182 include air trapped in the annular cavity 142, air pockets 154 generally extend along a portion of the annular cavity 142 with at least an outer surface portion 186 of the air pocket 154 defined by the liner 12 and at least another outer surface portion 190 of the air pocket 154 defined by the resin 18 and/or fiber 16, as illustrated in FIG. 6. Further, the resin 18 forms rigid pockets 154 in the annular cavities 142 during the cure process due to the presence of the air bubbles 150. In contrast, the air voids 182 are defined by the barrier 14 and the liner 12, i.e., the resin 18 and/or wet fiber 16 do not define boundaries of the air voids 182 since the air voids 182 are between the barrier 14 and the liner 12, as illustrated in FIG. 8.

Figure 10:
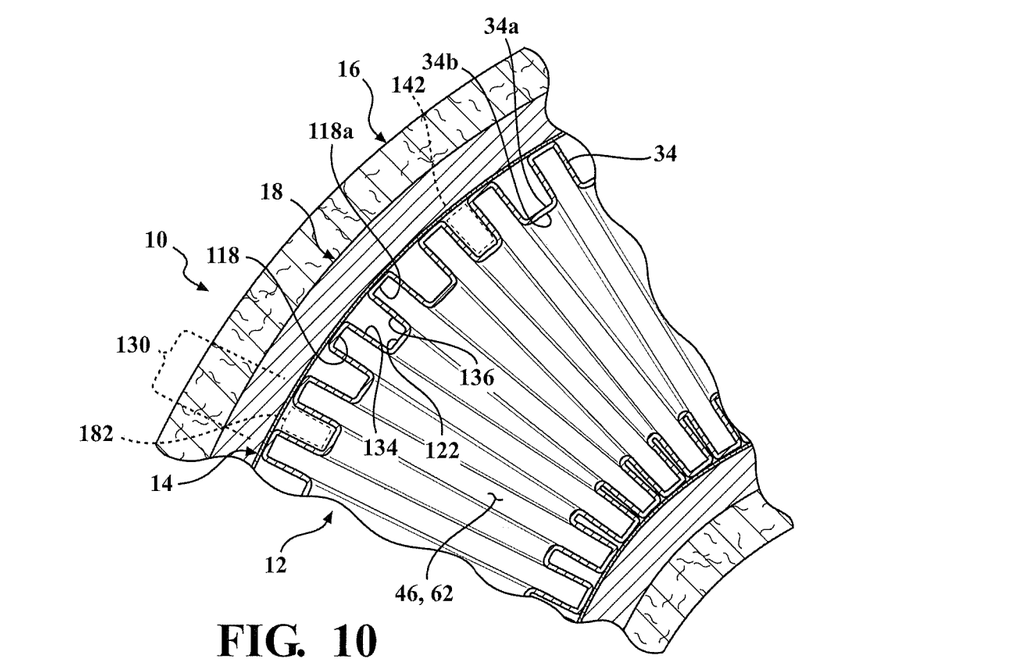
FIG. 10 is an enlarged cross-sectional view of the liner of FIG. 7 with a resin layer applied to the barrier and a fiber layer applied to the resin layer, according to another embodiment of the present invention.
Figure 11:
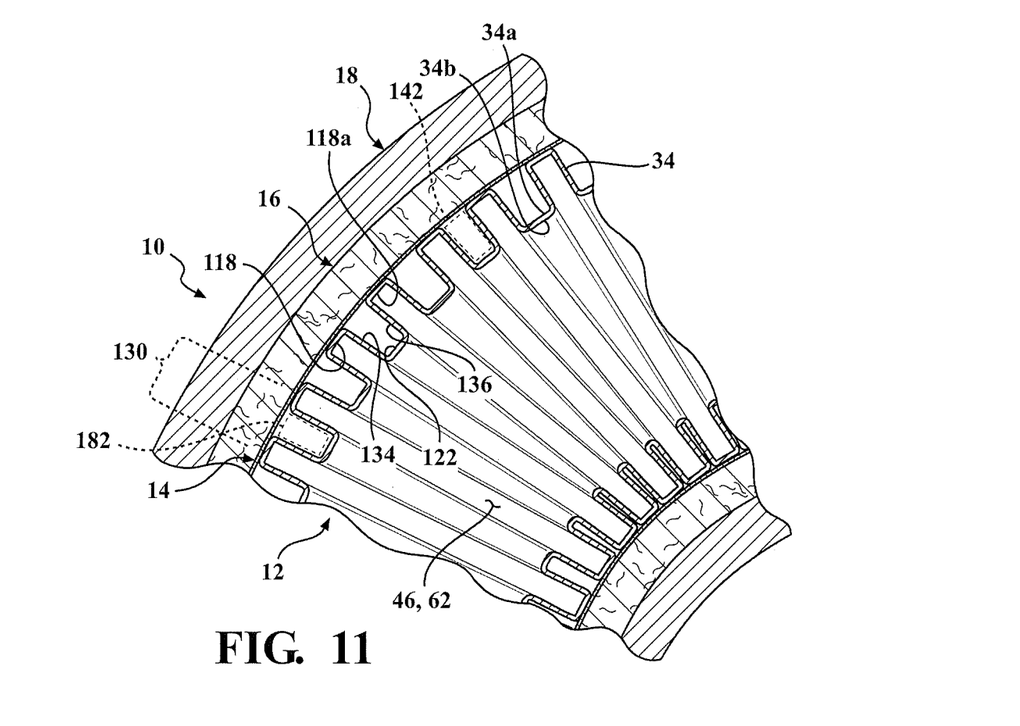
FIG. 11 is an enlarged cross-sectional view of the liner of FIG. 7 with a fiber layer applied to the barrier and a resin layer applied to the fiber layer, according to another embodiment of the present invention.

In one embodiment, resin fiber composite 170 is applied to the barrier 14, as illustrated in FIGS. 8 and 9. Resin fiber composite 170 comprises a mixture of liquid resin 18 and fiber 16. FIG. 10 illustrates an embodiment wherein liquid resin 18 is applied to the barrier 14 followed by application of fiber 16 to the resin 18. In contrast, FIG. 11 illustrates a fiber 16 layer applied to the barrier 14 followed by application of resin 18 to the fiber 16 layer. With each of the three methods shown in FIGS. 8-11, the barrier 14 prevents intrusion of the resin 18 into the annular cavities 142 of the corrugated segments 130. Air voids 182 are formed between the barrier 14 and the liner 12 in the annular cavities 142.

The resin 18 and fiber 16 can be applied to the barrier 14 in typically known methods. Suitable resins 18 include epoxy-based resins including Hexion™ EPON 862, vinylester resin, polyester resin, urethane, and the like. Suitable fibers 16 include Hyosung™ H2550 12 k carbon fiber, other carbon fibers, aramid fibers (Dupont™ Kevlar®, Teijin Aramid Technora®, Teijin Aramid Twaron®, and the like), Honeywell Spectra® fiber, polyethylene fiber, polyester fiber, Nylon fiber, a metal, glass fiber, and the like. In one embodiment, thermoplastic fiber (i.e., Nylon) can be commingled with carbon fiber.

An exemplary manufacturing method of a type IV pressure vessel 10 according to the present invention includes the steps of: a) providing a liner 12 having a corrugate section 46, 62 comprising circumferential corrugations 130 providing alternating ridges 118, 118a and grooves 122 arranged from one end to an opposing end of the corrugated section 46, 62; b) applying a barrier 14 to an outer surface 34a of the corrugated section 46, 62 from one end to the opposing end of the corrugated section 46, 62 and extending around the corrugated section 46, 62 circumference such that air voids 182 are formed in the annular cavities 142 between the liner 12 and the barrier 14; c) applying liquid resin 18 to an outer surface 14a of the barrier 14 completely coating the outer surface 14a of the barrier 14; d) assembling the coated liner 12 with a valve 22 to form a pressure vessel 10; and e) curing the liquid resin 18 to form cured resin 18. The exemplary manufacturing method optionally includes the steps of applying fiber 16 to the barrier 14 prior to and/or after applying resin 18 to the barrier 14. Further, the exemplary manufacturing method optionally includes mixing fiber 16 with the liquid resin 18 prior to applying a resin fiber composite 170 mixture to the barrier 14. Optionally, the exemplary manufacturing method includes the step of adhering and/or fusing the barrier 14 to itself 14 and/or to the liner 12 before, during, and/or after the resin 18 is cured. Further, the exemplary manufacturing method alternatively includes the step curing and/or hardening the liquid resin 18 to form cured resin 18 prior to assembling the coated liner 12 with the valve 22 to form a pressure vessel 10.

Figure 12:
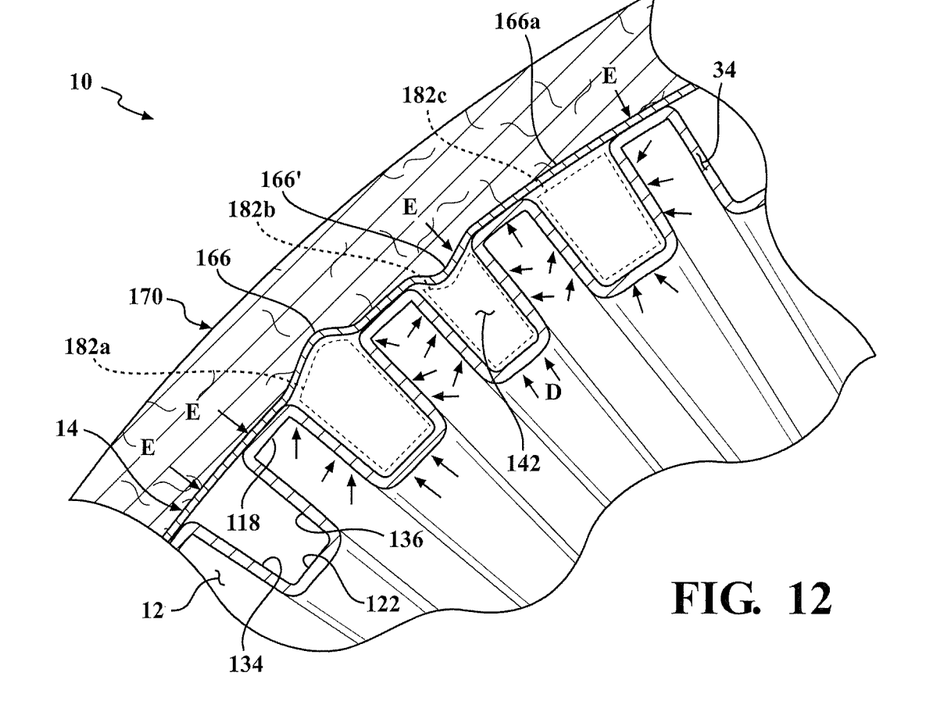
FIG. 12 an enlarged cross-sectional view of the liner of FIG. 8.

FIG. 12 illustrates resin fiber composite 170 assembled with the barrier 14 on a corrugated section 46, 62 of the liner 12. In the embodiment shown in FIG. 12, a first portion 166a of the barrier 14 follows the outer contour of the liner 12, a second portion 166' of the barrier 14 intrudes into the annular cavity 142 of the liner 12, and a third portion 166 gaps away from the liner 12. The volume of the air voids 182a-182c that form in each annular cavity 142 under the barrier 14 may vary depending on the localized contour of the barrier 14 without varying the scope of the invention.

When the liner 12 is assembled into a pressure vessel 10 and the pressure vessel pressurized 10, pressure D applied to the corrugated liner 12 is generally distributed uniformly across a majority of the side walls 134, 136 and the grooves 122 of the liner 12, as represented by arrow D shown in FIG. 12. The potential for leaks and ruptures of the liner 12 is reduced in comparison to a pressure vessel 12 lacking the barrier 14 since the resin fiber composite 170 evenly supports the liner 12, as represented by arrow E, and as further described below. The barrier 14 prevents localized elevated strain on the liner 12 by eliminating the rigid air pockets 154 in the resin 16 in the annular cavities 142.

Figure 13A:
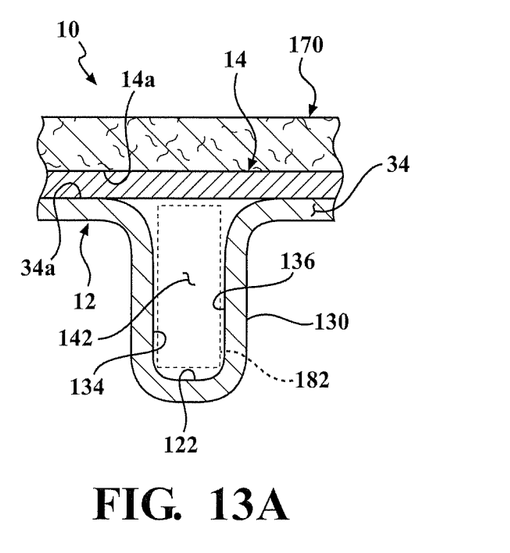
FIGS. 13A and 13B are enlarged cross-sectional views of a corrugated section of the liner of FIG. 2 with a thermoplastic barrier applied to the liner and a resin fiber composite applied to the thermoplastic barrier as manufactured and after undergoing a plurality of pressure cycles, according to another embodiment of the present invention.
Figure 13B:
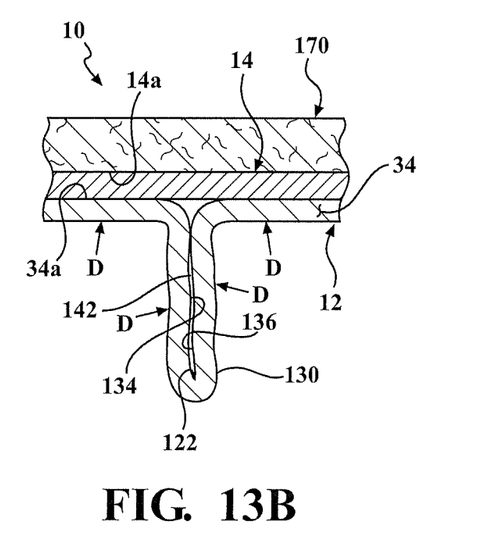

FIGS. 13A and 13B illustrate the effect of pressurization on the corrugated segment 130 of the liner 12 when a thermoplastic barrier 14 is applied to the liner 12 prior to application of the resin fiber composite 170. FIG. 13A shows the annular space 142 of the corrugated segment 130 of liner 12 containing an air void 182 under the thermoplastic barrier 14 as manufactured and before pressure is applied to the liner 12. FIG. 13B illustrates the effect of pressurization on the liner 12. Upon pressurization, illustrated by arrow D, the liner 12 expands until the liner 12 is in contact with either itself 12 or the barrier 14, at which point the liner 12 is fully supported without experiencing damaging amounts of strain. The annular cavity 142 is collapsed by the expanding liner 12 as illustrated by FIG. 13B. Further, as illustrated in FIG. 13B, the distance between the opposing side walls 134, 136 decreases as the pressure is applied to the liner 12. The barrier 14 generally retains its shape since it is thermoplastic and not elastomeric.

Figure 14A:
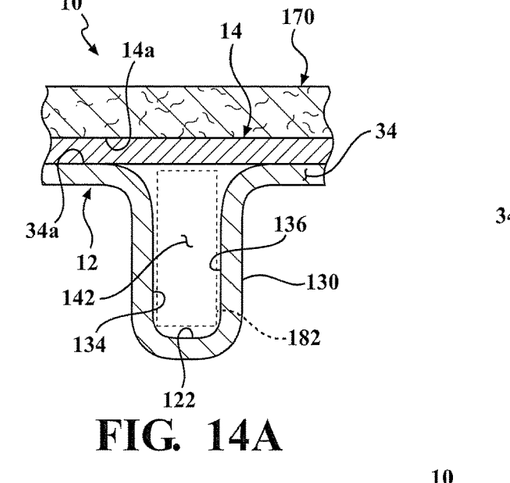
FIGS. 14A and 14B are an enlarged cross-sectional views of a corrugated section of the liner of FIG. 2 with an elastomeric barrier applied to the liner and a resin fiber composite applied to the elastomeric barrier as manufactured and after undergoing a plurality of pressure cycles, according to another embodiment of the present invention.
Figure 14B:
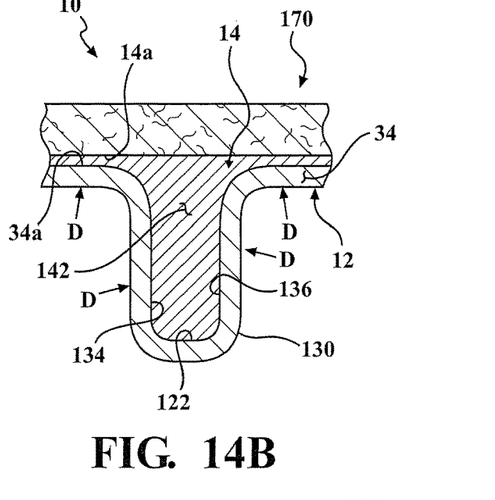

FIGS. 14A and 14B illustrate the effect of pressurization on the corrugated liner 12 when an elastomeric barrier 14 is applied to the liner 12 prior to application of the resin fiber composite 170. FIG. 14A shows the annular space 142 of the corrugated segment 130 of the liner 12 containing an air void 182 under the elastomeric barrier 14 as manufactured and before pressure is applied to the liner 12. FIG. 14B illustrates the effect of pressurization on the liner 12. Upon pressurization, illustrated by arrow D, the liner 12 expands until the liner 12 is in contact with either itself 12 or the barrier 14 material, at which point the liner 12 is fully supported without experiencing damaging amounts of strain. However, since the barrier 14 is elastomeric, the expansion of the liner 12 towards the barrier 14 forces some of the elastomeric barrier 14 material into the annular space 142, as illustrated in FIG. 14B. Thus, the amount the liner 12 collapses into the annular space 142 is somewhat different for the thermoplastic barrier 14 in comparison to the elastomeric barrier 14. Regardless of whether an elastomeric or thermoplastic barrier 14 is applied to the liner 12, the liner 12 is fully supported by the barrier 14 or by another surface of the liner 12 when the pressure vessel 10 is pressurized.

Figure 15A:
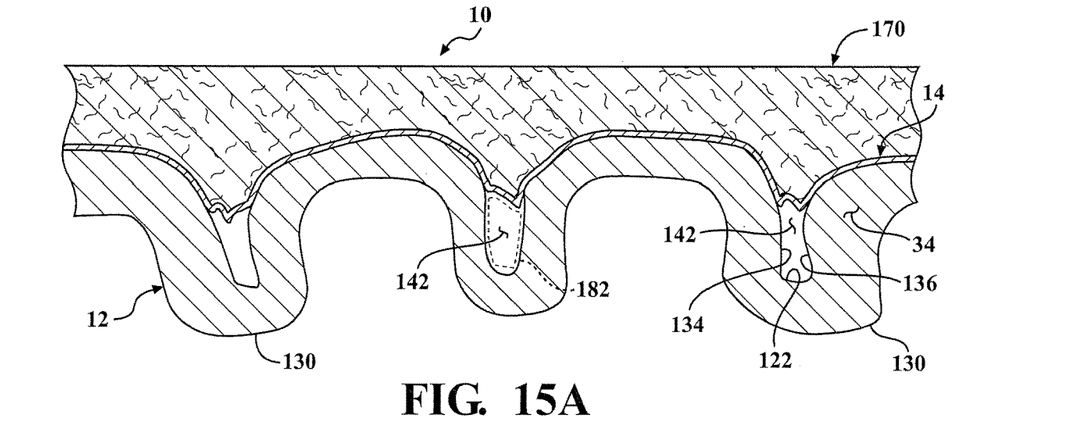
FIGS. 15A and 15B are enlarged cross-sectional views of a portion of a pressure vessel illustrating a liner, an elastomeric barrier applied to the liner, and resin fiber composite applied to the barrier as manufactured and after undergoing a plurality of pressure cycles, according to another embodiment of the present invention.

FIGS. 15A and 15B are cross-sectional views of a corrugated polymer liner 12 before and after pressurization, respectively. Referring to FIG. 15A, the liner 12 is covered with polyurethane tape barrier 14 prior to application of the resin fiber composite 170. The annular cavities 142 of the corrugated segments 130 contain air voids 182 under the barrier 14. The polyurethane tape barrier 14 is an elastomeric material. The resin fiber composite 170 presses the barrier 14 partially into the annular cavities 142. The resin fiber composite 170 comprises liquid resin 18 and fiber 16. The barrier 14 prevents intrusion of resin 18 between the barrier 14 and the liner 12.

Figure 15B:
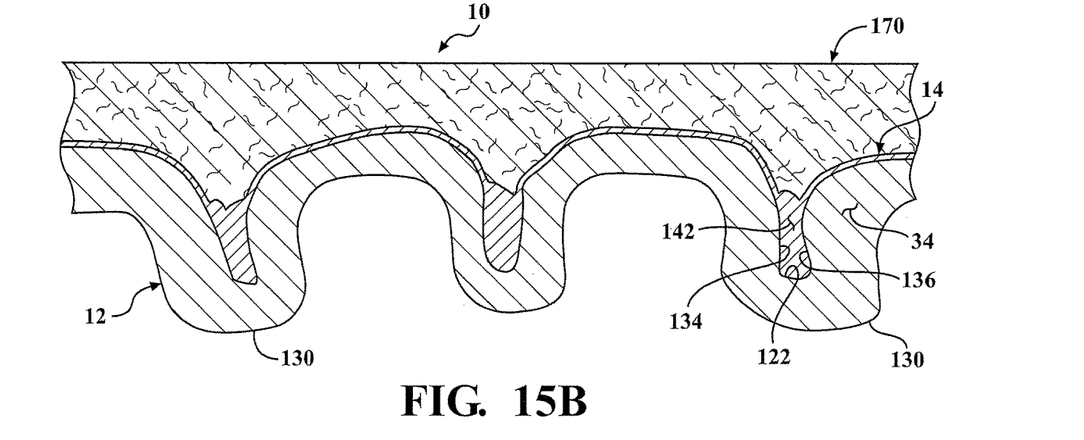

FIG. 15B shows the effect of pressure cycles between on the liner 12, the barrier 14, and the resin fiber composite 170 of FIG. 15A. The pressure vessel 10 was subjected to approximately 2,800 pressure cycles between 2 MPa to 87.5 MPa (290 PSI to 12,691 PSI). The elevated pressure causes the liner 12 to be pressed against the resin fiber composite 170 with the liner 12 collapsing inward towards the air voids 182 in the annular cavities 142. The outward expansion of the liner 12 causes the polyurethane tape barrier 14 to be pressed into the annular cavities 142, displacing any air trapped in the air voids 182. As illustrated in FIG. 15B, the air voids 182 have greatly decreased in size to the point of being indistinguishable. The liner 12 is generally uniformly distorted with no apparent localized thinning of the liner wall 34. Thus, using a barrier 14 prevents intrusion of resin 18 in the annular spaces 142 and prevents formation of rigid air pockets 154 in the annular cavities 142. The barrier 14 allows the liner 12 to be strained uniformly, avoiding blisters 158 in the liner wall 34.

Figure 16A:
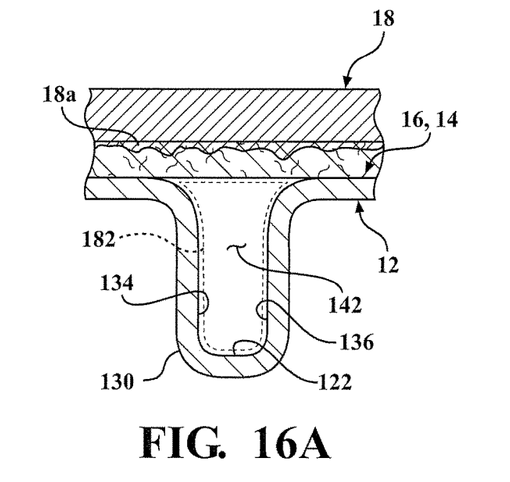
FIGS. 16A and 16B are enlarged cross-sectional views of a corrugated segment of the liner of FIG. 2 with a dry fiber barrier applied to the liner with resin applied to the dry fiber barrier as manufactured and after undergoing a plurality of pressure cycles, according to another embodiment of the present invention.
Figure 16B:
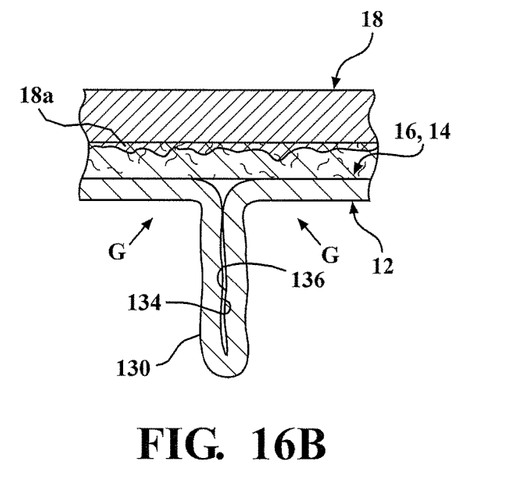

FIGS. 16A and 16B illustrate the effect of pressurization on a corrugated segment 130 of the liner 12 when a dry fiber 16 barrier 14 is applied to the liner 12 prior to application of the resin 18 and additional fiber 16. Instead of applying a separate barrier 14 of a thermoplastic or elastomeric material, dry fiber 16 can be applied to the liner 12 of sufficient thickness to prevent resin 18 intrusion into the annular cavities 142.

FIG. 16A illustrates a corrugated segment 130 of the liner 12 coated with dry fiber 16 barrier 14 followed by application of resin 18. The first one or more layers of dry fiber 16 may be deposited onto the liner 12 without the infusion of resin 18, allowing the dry fibers 16 to wick up resin 18 (represented by area 18a) that is infused with subsequent layers of fiber 16 to stop the resin 18 from reaching the annular cavities 142 of the liner 12. Selecting a sufficiently thick dry fiber 16 barrier 14 layer will prevent intrusion of the resin 18 into the annular cavities 142. As illustrated in FIG. 16A, the annular cavity 142 of the corrugated segment 130 of the liner 12 contains an air void 182 under the dry fiber 16 barrier 14 as manufactured before pressure is applied to the liner 12.

FIG. 16B illustrates the effect of pressurization on the liner 12 coated with the dry fiber 16 barrier 14 and resin 18. Upon pressurization, illustrated by arrow G, the liner 12 expands until the liner 12 is in contact with either itself or the dry fiber 16 barrier 14, at which point the liner 12 is fully supported without experiencing damaging amounts of strain. The annular cavity 142 is collapsed by the expanding liner 12 as illustrated by FIG. 16B. As such, the dry fiber 16 barrier 14 acts similar to the thermoplastic barrier 14 shown in FIG. 13B.

Regardless of whether an elastomeric, thermoplastic, or dry fiber 16 barrier 14 is applied to the liner 12 prior to the addition of resin 18, the liner 12 is fully supported by the barrier 14 or itself when the pressure vessel 10 is pressurized. The thermoplastic and elastomeric barriers 14, as well as the method of depositing the first layer(s) of dry fiber 16 onto the liner 12 without resin 18, prevent resin 18 intrusion into the annular cavities 142 between the liner 12 and the barrier 14. Since resin 18 does not intrude between the barrier 14 and the liner 12, the resin 18 cannot cure into rigid pockets 154 in the annular cavities 142.

Figure 17A:
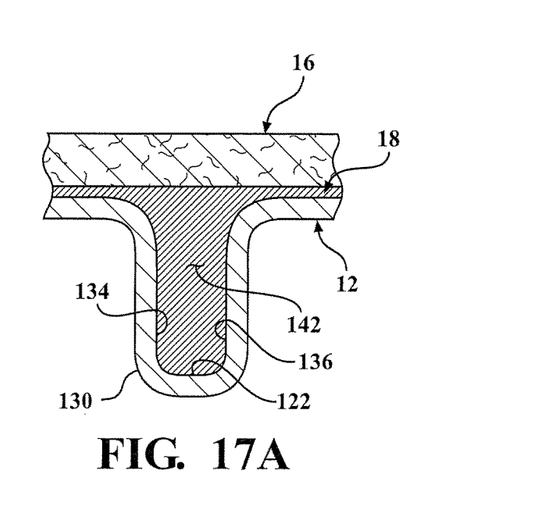
FIGS. 17A and 17B are enlarged cross-sectional views of a corrugated segment of the liner of FIG. 2 coated with resin including a wetting agent followed by application of a fiber layer to the resin as manufactured and after undergoing a plurality of pressure cycles, according to another embodiment of the present invention.
Figure 17B:
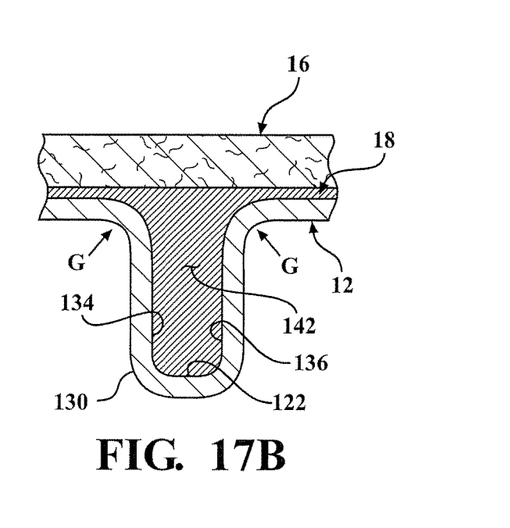

Alternatively, adding a wetting additive, an air-release agent, and/or a defoaming agent to the resin 18 improves the ability of the resin 18 to fill the annular cavities 142 between the liner 12 and the fibers 16 without creating air pockets 154 and without requiring a separate barrier 14, as shown in FIGS. 17A and 17B. Adding a wetting additive increases the resin's 18 ability to wet the surface of the liner 12 in the 122 of the corrugated segments 130. Further, the wetting additive, the air-release agent, and/or the defoaming agent dissipate air bubbles 150 and allow the resin 18 to completely fill the annular cavities 142 of the liner 12. FIG. 17A illustrates the liner 12 coated with resin 18 containing a wetting additive and coated with a layer of fiber 16 prior to application of pressure. FIG. 17B illustrates the effect of pressurization on the liner 12 coated with the resin 18 mixed with the wetting additive and covered with fiber 16. The liner 12 is minimally affected by application of pressure (illustrated by arrow G) since the liner 12 is evenly supported by the cured resin 18 that fully fills the annular cavities 142. The liner 12 is less likely to blister since resin 18 completely fills the annular cavities 142 to preclude formation of rigid pockets 154 during the curing process.

One exemplary suitable additive is a mixture of oligomeric substances with wetting agents, such as BYK® BYK-P 9920. A second suitable additive is a solvent-free air release additive with wetting properties, such as BYK® BYK-S 732. Other suitable additives include polyether-modified methyl alkyl polysiloxane copolymer, and the like.

One benefit of a pressure vessel 10 having a barrier 14 between the corrugated section 46, 62 of the liner 12 and the resin 18 is the pressure vessel 10 is resistance to leakage through the corrugated sections 46, 62. A second benefit is the barrier 14 prevents the formation of rigid air pockets 154 in the resin 18 in the grooves 122 of the corrugated section 46, 62. A third benefit is the barrier 14 creates an air void 182 within each of the annular cavities 142 such that the side walls 134, 136 and groove 122 portions of the annular cavities 142 are evenly supported when the pressure vessel 10 is pressurized. A fourth benefit is the barrier 14 prevents contact between the resin 18 and the liner 12.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A method for manufacturing a type IV pressure vessel for containing liquids and/or gases under pressure, said method comprising:
providing a polymer liner having a tubular portion wherein said tubular portion includes a corrugated section having circumferential corrugations providing alternating ridges and grooves arranged from one end to an opposing end of said corrugated section, each of said circumferential corrugations comprising a first ridge section, a first side wall extending between said first ridge section and a first groove section, and a second side wall opposing said first side wall and extending between said first groove section and a second ridge section, wherein air volume between said first side wall, said first groove section, and said second side wall defines an annular cavity on an outer surface of said corrugated section;
applying a barrier to said outer surface of said corrugated section from said one end to said opposing end of said corrugated section and extending around said corrugated section circumference such that air voids are formed in said annular cavities between said liner and said barrier; and
applying fiber and resin to an outer surface of said barrier wherein said barrier prevents intrusion of said resin between said barrier and said liner in said corrugated section;
curing said resin; and
pressurizing said polymer liner;
wherein upon pressurization, said polymer liner expands and said annular cavities are collapsed by said expanding polymer liner such that the distance between said opposing first and second side walls decreases as pressure is applied to said polymer liner.

2. The method as set forth in claim 1, wherein said polymer liner comprises one or more of Nylon, ethylene-vinyl acetate (EVA), linear low density polyethylene (LL-DPE), low-density polyethylene (LDPE), high density polyethylene (HDPE), polypropylene (PP), ethylene vinyl alcohol (EVOH), polytetrafluoroethylene (PTFE), polyurethane (PU), and/or polyvinyl chloride (PVC).

3. The method as set forth in claim 2, wherein said resin comprises one or more of an epoxy resin, a vinylester resin, a polyester resin, and/or urethane.

4. The method as set forth in claim 3, wherein said fiber comprises one or more of carbon fiber, aramid fiber, polyester fiber, polyethylene fiber, Nylon fiber, a metal, and/or glass fiber.

5. The method as set forth in claim 4, wherein said barrier is one or more of a tape, a film, a sheet, a wrap, and/or molded rubber.

6. The method as set forth in claim 5, wherein said barrier is one or more of polysiloxane, polyurethane (PU), polytetrafluoroethylene (PTFE), Nylon, synthetic rubber, silicone, ethylene propylene diene terpolymer (EPDM), polyethylene (DPE), polypropylene (PP), polyvinyl chloride (PVC), and/or acrylonitrile butadiene rubber (Nitrile).

7. The method as set forth in claim 6, wherein said barrier is an elastomeric material.

8. The method as set forth in claim 7, wherein said liner expands until said liner is in contact with either itself and/or said barrier after pressurization of said pressure vessel and said barrier fills said annular cavities.

9. The method as set forth in claim 6, wherein said barrier is a thermoplastic material.

10. The method as set forth in claim 9, wherein said liner expands until said liner is in contact with either itself and/or said barrier after pressurization of said pressure vessel.

11. The method as set forth in claim 6, wherein said barrier is self-fusing.

12. The method as set forth in claim 6, wherein said barrier includes an acrylic adhesive backing layer.

13. The method as set forth in claim 4, wherein said barrier comprises a one or more layers of dry fiber preventing intrusion of said resin into said annular cavities.

14. A type IV pressure vessel for containing liquids and/or gases under pressure, said pressure vessel comprising:
a polymer liner having a tubular shaped section extending in a longitudinal direction and including a corrugated section having circumferential corrugations providing alternating ridges and grooves arranged from one end to an opposing end of said corrugated section, each of said circumferential corrugations comprising a first ridge section, a first side wall extending between said first ridge section and a first groove section, and a second side wall opposing said first side wall and extending between said first groove section and a second ridge section, wherein air volume between said first side wall, said first groove section, and said second side wall defines an annular cavity on an outer surface of said corrugated section;

a barrier layer adjacent said corrugated section, extending around an outer circumference of said corrugated section, and extending from said one end to said opposing end of said corrugated section; and fiber and resin coating an outer surface of said barrier layer, extending around an outer circumference of said barrier layer, and extending from said one end to said opposing end of said corrugated section;

wherein said barrier layer prevents resin intrusion between said barrier layer and said corrugated section; and wherein said liner expands in response to pressurization of said pressure vessel and said annular cavities are collapsed by said expanding liner such that the distance between said opposing first and second side walls decreases as pressure is applied to said liner.

15. The pressure vessel as set forth in claim 14, wherein said polymer liner comprises one or more of Nylon, ethylene-vinyl acetate (EVA), liner low density polyethylene (LLDPE), low-density polyethylene (LDPE), high density polyethylene (HDPE), polypropylene (PP), ethylene vinyl alcohol (EVOH), polytetrafluoroethylene (PTFE), polyurethane (PU), and/or polyvinyl chloride (PVC).

16. The pressure vessel as set forth in claim 15, wherein said resin layer comprises one or more of an epoxy resin, a vinylester resin, a polyester resin, and/or urethane.

17. The pressure vessel as set forth in claim 16, wherein said fiber is one or more of carbon fiber, aramid fiber, polyester fiber, polyethylene fiber, Nylon fiber, a metal, and/or glass fiber.

18. The pressure vessel as set forth in claim 17, wherein said barrier layer is a tape, a film, a sheet, a wrap, and/or molded rubber.

19. The pressure vessel as set for in claim 18, wherein said polymer liner is a multi-layer liner.

20. The pressure vessel as set forth in claim 19, wherein said barrier layer comprises one or more of one or more of polysiloxane, polyurethane (PU), polytetrafluoroethylene (PTFE), Nylon, synthetic rubber, silicone, ethylene propylene diene terpolymer (EPDM), polyethylene (DPE), polypropylene (PP), polyvinyl chloride (PVC), and/or acrylonitrile butadiene rubber (Nitrile).

21. The pressure vessel as set forth in claim 19, wherein said barrier layer comprises one or more layers of dry fiber preventing intrusion of said resin layer into said annular cavities.

22. The pressure vessel as set forth in claim 16, wherein said resin includes a wetting additive.

23. The pressure vessel as set forth in claim 22, wherein said wetting additive is one or more of BYK® BYK-P 9920, BYK® BYK-S 732, a solvent-free air release additive with wetting properties, and/or polyether-modified methyl alkyl polysiloxane copolymer.

* * * * *